United States Patent [19]

Grabler et al.

[11] Patent Number: 4,571,804

[45] Date of Patent: Feb. 25, 1986

[54] O-RING INSERTION TOOL

[75] Inventors: Wolfgang Grabler, Mannheim; Werner Klepsch, Neustadt, both of Fed. Rep. of Germany

[73] Assignee: Deere & Company, Moline, Ill.

[21] Appl. No.: 704,110

[22] Filed: Feb. 21, 1985

[30] Foreign Application Priority Data

Feb. 21, 1984 [DE] Fed. Rep. of Germany ....... 3406144

[51] Int. Cl.4 .............................................. B23D 19/02
[52] U.S. Cl. ........................................ 29/235; 29/280
[58] Field of Search .......................... 29/235, 229, 280

[56] References Cited

U.S. PATENT DOCUMENTS

| | | | |
|---|---|---|---|
| 3,180,015 | 4/1965 | Thompson et al. | 29/235 |
| 4,261,089 | 4/1981 | Taylor | 29/235 |
| 4,455,729 | 6/1984 | Dugan | 29/235 |
| 4,501,054 | 2/1985 | Morgan | 29/235 |

FOREIGN PATENT DOCUMENTS 2551363 5/1977 Fed. Rep. of Germany .

*Primary Examiner*—James L. Jones, Jr.

[57] ABSTRACT

A tool for inserting O-rings into a recess provided in a bore in a part comprises a cylindrical housing having a cylindrical O-ring stripper rigid therewith and projecting from one end thereof. A plunger is reciprocably mounted within the housing for movement along its axis from a resiliently balanced, equilibrium position. An O-ring holder includes a pair of bars pivotally coupled to one end of the plunger and projecting from the housing through a notch dividing the stripper into two halves. The holder bars are each provided with a notch or jaw, with the latter being spaced for gripping an O-ring at diametrically opposite locations. An O-ring guide is reciprocably mounted to the plunger and extends between the two holder bars. A spring normally holds the guide for movement with the plunger but permits the guide to retract within the plunger when an O-ring is being picked up by the holder bars.

13 Claims, 4 Drawing Figures

O-RING INSERTION TOOL

BACKGROUND OF THE INVENTION

The present invention relates to a tool for inserting O-rings into a recess provided in a bore formed in the body of a part and having an open end accessible to the tool. More specifically, the tool is of a type including a housing having an O-ring carrier or holder mounted thereto at one end thereof and adapted for movement into the bore end together with an O-ring guide which prevents the O-ring from being pushed past the recess by a stripper which is mounted for movement relative to the carrier.

Such O-ring insertion tools serve to simplify the insertion of O-rings into an associated recess or ring groove. The rings may be sealing rings, felt wiper rings or spacing rings, etc. The tool is especially useful in installing small diameter O-rings, i.e., smaller than 15 mm., since it is almost impossible to install O-rings of this size by just using one's fingers.

West German published Patent Application No. 2,551,363 dated Mar. 26, 1977 discloses a known tool, on which the present invention is based. In order to load this known tool, an O-ring is pushed with the fingers over a guide and inserted at an angle into an O-ring carrier formed by a ring having a conical interior surface. This tool must be held in a position in which either an O-ring stripper moves on its own away from the carrier so as to permit an O-ring to be loaded into the carrier, or the stripper must be particularly held with the hand. In the case of very small and soft O-rings, such loading is very difficult and if the loading is faulty, it is to be expected that the function of the insertion tool will be impaired or the O-ring will be destroyed.

SUMMARY OF THE INVENTION

According to the present invention there is provided an O-ring insertion tool which is an improvement over the tool disclosed in West German published Patent Application No. 2,551,363.

A broad object of the invention is to provide an insertion tool into which an O-ring may be easily properly loaded and which then may be manipulated to easily properly place an O-ring in a recess formed in a bore.

More specifically, it is an object of the invention to provide an O-ring insertion tool including a stripper fixed to one end of a cylindrical housing of the tool and to provide an O-ring carrier which is reciprocably mounted for movement relative to the stripper along the axis of the housing, such movement being resisted by compressive forces to thereby prevent spontaneous movement of the carrier relative to the stripper.

A further object of the invention is to provide an O-ring insertion tool having an O-ring holder reciprocably mounted in and projecting from one end of the housing and including a pair of pivotable members having formed, in one end thereof, O-ring jaws in the form of recesses adapted for engaging and capturing diametrically opposite locations of an O-ring sitting on a flat support surface.

Yet, a more specific object is to provide an O-ring insertion tool having an O-ring holder, as stated above, wherein the pair of pivotable members are resiliently biased apart and are guided by channels in the inside surface of the housing so as to spread a desired distance apart, as the members are shifted outwardly from the end of the housing, for accurately disposing the jaws for picking up an O-ring of a given size.

Still another object of the invention is to provide an O-ring insertion tool having a cylindrical housing having an O-ring guide and holder carried by a plunger axially shiftably mounted in the housing and biased to an equilibrium position therein and the plunger including a button threaded on an end, opposite from that to which the holder is mounted, for adjusting the stroke of the plunger so that the holder is properly positioned for grasping an O-ring when the plunger is extended a maximum amount with the button engaging the housing.

These and other objects, features and advantages of the present invention will become apparent to those skilled in the art from the description which follows and from the drawings.

DESCRIPTION OF THE PREFERRED EMBODIMENT

Figure 1:
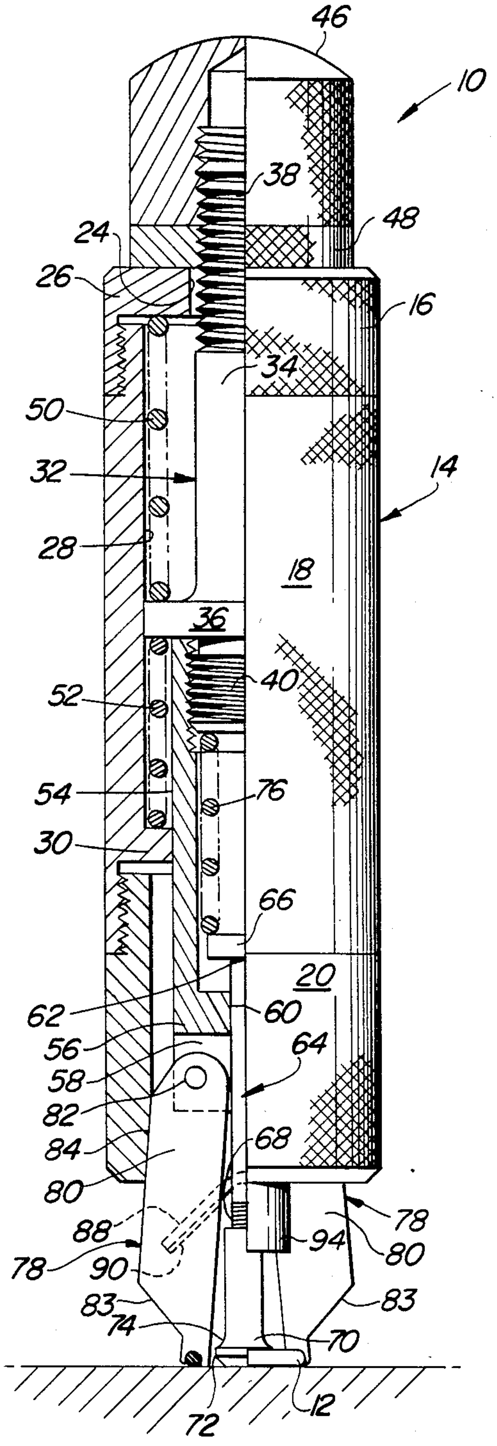
FIG. 1 is a longitudinally split, longitudinal sectional view taken through the O-ring insertion tool with the parts thereof shown in the respective positions they occupy when the tool is operated to pick up an O-ring from a flat support surface.

The drawings show an O-ring insertion tool 10 that is used to insert O-rings, such as exemplified at 12. It consists of a three-part cylindrical housing 14 that forms a hand grip. The three parts, beginning from the top of the drawing, are designated a cap 16, a grip 18, and a guide shell 20. The cap 16, grip 18 and guide shell 20 are all arranged coaxially, screwed together like a sleeve joint and have the same outer diameter. The end of the insertion tool 10 toward the guide shell 20 is called the pick-up end in the following. It is in the drawing, as in common use, at the bottom while the cap 16 is at the top. The terms up, down, left and right as used in the following thus refer to the view in the drawings and to the normal position of the insertion tool 10 when O-rings 12 are picked up and inserted. Naturally, however, the insertion tool 10 can also be held in any other position desired.

The housing 14 is knurled along its entire length so that an operator can grasp it without slipping. It may be made of steel or alternatively of lighter materials such as aluminum or plastic. The cap 16 closes the top of the grip 18 and a central bore 24 penetrates a top end wall 26 thereof. The grip 18 is in the form of a shell with a central bore 28 having an annular shoulder 30 toward its lower end. A plunger or slider 32 is received within and is mounted for shiftable movement along the longitudinal axis of the housing. The plunger 32 includes an upper stem 34 having an annular shoulder 36 sized to have a sliding fit with the bore 28. The upper and lower ends of the stem 34 are threaded as at 38 and 40, respectively. The threaded upper end 38 of the stem 34 extends through the bore 24 in the cap 16 and an internally threaded button 46 is screwed onto the stem end 38 and is secured against loosening by a threaded lock washer 48. The outer surface of the button 46 and the lock washer 48 are also knurled. A coil compression spring 50 extends between the top of the stem annular shoulder 36 and the cap wall 26 and a coil compression spring 52 extends between the bottom of the annular shoulder 36 and the top of the grip annular shoulder 30. The spring 50 has a greater spring rate than the spring 52 for a purpose explained below.

The slider 32 further includes a lower tubular portion 54, of constant outside diameter, slidably received in the annular shoulder 30 of the grip 18. The upper end of the portion 54 is internally threaded and screwed onto the threaded lower end 40 of the stem 34. The tubular portion 54 includes a base 56 which closes its lower end and is slotted transversely so as to form a downwardly opening fork 58 having a purpose explained below. An opening 60 extends axially through the base 56. Slidably received in the opening 60 is a stem 62 of a T-shaped O-ring guide holder 64 having a flat upper end 66 and a threaded lower end 68. A cylindrical O-ring guide 70 includes a threaded blind bore at its upper end and is screwed onto the lower end of the holder 64. The lower end of the guide 70 is enlarged, as at 72, to a diameter that is slightly smaller than the inner diameter of the O-ring 12 to be inserted. A smooth radius 74 exists at the transition between the remainder of the holder and the enlarged lower end 72. A coil compression spring 76 is located within the tubular lower end portion 54 of the slider 32 and acts between the threaded lower end 40 of the stem 34 and the top of the flat upper end 66 of the guide holder 64 and normally acts to hold the end 66 against the base 56.

An O-ring holder or carrier 78 comprises a pair of flat holder bars 80, of rectangular cross section, having rounded upper ends received within and pinned to the slider fork 58, as at pins 82 located on opposite sides of and extending perpendicular to the longitudinal axis of the housing 14. The bars 80 project downwardly beyond the lower end of the shell 20. The bars 80 have respective inclined lower end surfaces 83 which converge towards and terminate at respective downwardly opening O-ring receptacles or jaws 84 (FIG. 3), each jaw having a width slightly less and a depth slightly greater than the thickness of the O-ring 12. The shape of the jaws 84 and the arrangement of the bars 80 is such that the jaws 84 are symmetrical relative to the longitudinal axis of the holder 14 and grasp an O-ring at two diametrically opposite points when the jaws are pressed over the O-ring 12. The bars 80 are received in and guided by diametrically opposite grooves or tracks 86 formed lengthwise inside of the guide shell 20. The bottom surfaces of the lower portions of the grooves 86 are each inclined outwardly, beginning at a point 87 (FIGS. 2 and 3), at an angle of about four degrees relative to a line extending parallel to the longitudinal axis of the housing 14. This inclination permits the lower ends of the bars 80 to spread apart as the slider or plunger 32 moves downwardly in the housing to the pick-up position shown in FIG. 1 to thereby dispose the jaws 84 correctly for picking up the O-ring 12. As can best be seen in FIG. 2, the bars 80 are urged apart so as to engage the bottom surfaces of the grooves 86 by a bowed wire spring 88 having opposite ends received in bores 90 extending downwardly and outwardly in the bars 80. The stem 62 of the O-ring guide holder 64 is provided with a vertically elongated opening 92 through which the spring 88 extends in non-interfering relationship to the holder 64. Other spring arrangements could, of course, be used to bias the bars 80 apart. For example, torsion springs could be mounted at the pins 82 so as to act between the plunger 32 and the bars 80 or a coil compression spring could extend horizontally through the O-ring holder 64 with opposite ends being received in seats provided in the bars 80.

A cylindrical tubular O-ring stripper 94 is formed integrally with and projects downwardly from the lower end of the shell 20. The diameter of the stripper 94 corresponds to that of a bore 96 provided in a part 98 and having an O-ring recess 100 in the wall thereof for receiving the O-ring 12. The stripper 94 is provided with a vertical notch which extends diametrically through and separates the stripper into two equal halves. The notch is aligned with the grooves 86 and receives the bars 80.

Based on the preceding, the functioning of the insertion tool 10 will be described in greater detail below. During the operation of the tool 10, the slider or plunger 32 together with the O-ring holder 78 moves relative to the housing 14 and the O-ring guide holder 64 and guide 70 move relative to the slider and housing.

Figure 2:
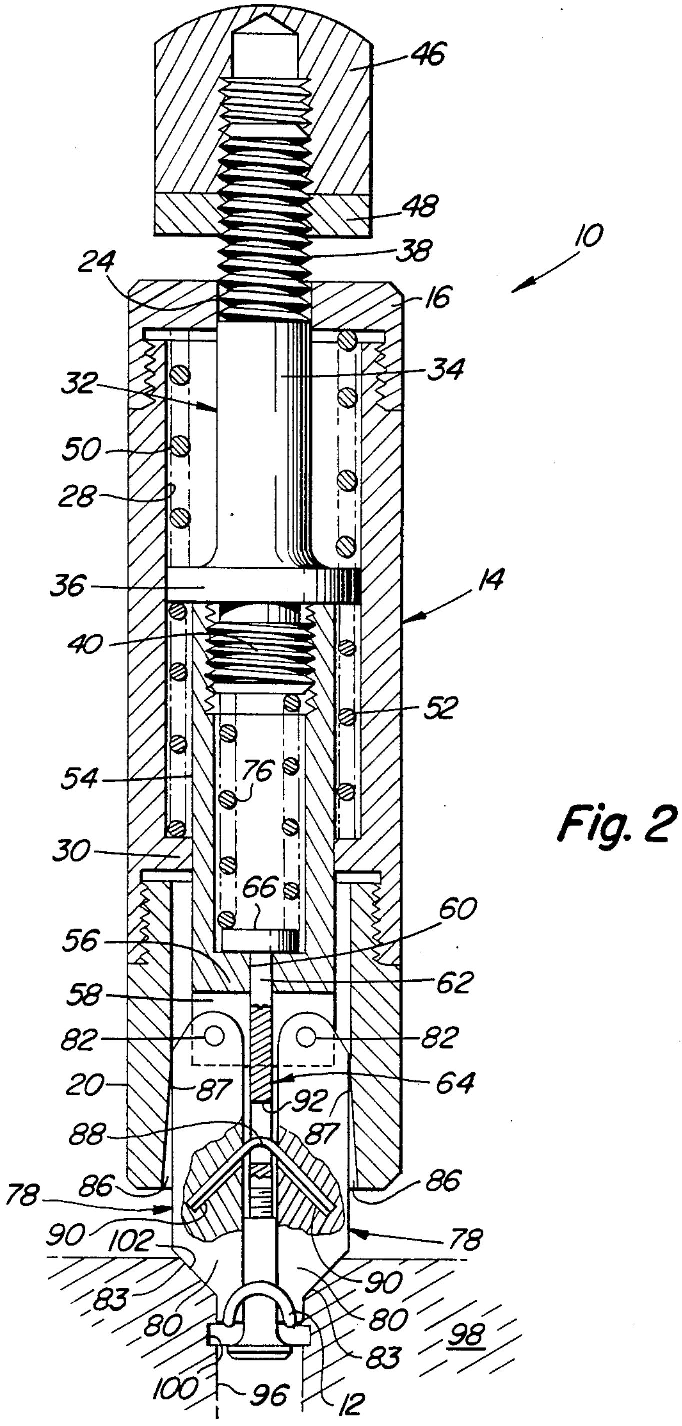
FIG. 2 is a longitudinal sectional view of the tool shown in FIG. 1 but shows the tool inserted in an open end of a bore in a part and in an equilibrium position with a picked-up O-ring properly positioned for being stripped off into an O-ring recess formed in the part bore.
Figure 4:
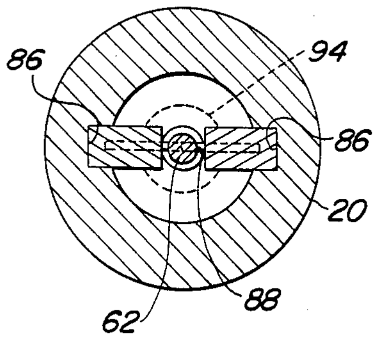
FIG 4 is a transverse sectional view taken along line 4—4 of FIG. 3.
Figure 3:
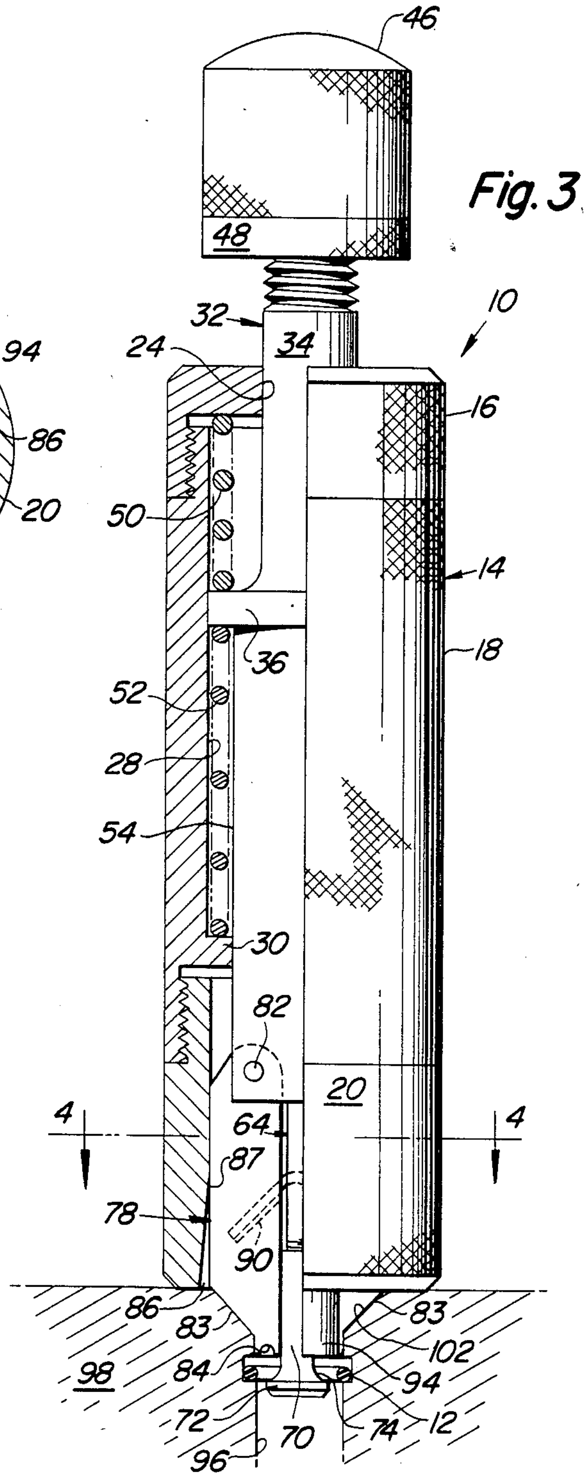
FIG. 3 is a view of the insertion tool showing the housing and stripper in split longitudinal section with the tool shown inserted in a part bore in an O-ring strip position wherein the housing and the stripper carried thereby have been shifted to place the O-ring in the recess.

The description of the functioning begins from the initial or rest position of the tool 10. In this initial position, the slider 32 is in an equilibrium position, determined by the springs 50 and 52, wherein the shoulder 36 is located approximately midway between the wall 26 and the shoulder 36, as shown in FIG. 2. The slider 32 is then positioned such that the lock washer 48 is spaced above the cap 16. The bars 80 of the O-ring holder 78 are then located high enough in the shell 20 that their upper ends are above the beginning points 87 of the inclined bottom surface portions of the grooves 86 and are constrained such that they extend parallel to each other and abut against opposite sides of the O-ring guide 70 above the enlarged bottom end 72 of the latter. The flat upper end 66 of the O-ring guide holder 62 is then held against the base 56 of the lower tubular portion 54 of the slider 32 by the spring 76. The slider 32 can be shifted axially in either direction from its equilibrium position until the spring 50 or the spring 52 is fully compressed, while the O-ring guide holder 64 and guide 70 can only move upwardly relative to the slider 32.

In order to pick up an O-ring 12 lying on a flat surface, as shown in FIG. 1, an operator grasps the grip 14 and depresses the button 46 with his thumb. The slider 32 is thus shifted downwardly and moves the O-ring holder 62 downwardly relative to the shell 20. The bars 80 then move outwardly against the inclined areas of the grooves 86 due to the action of the spring 88 whereby the lower ends of the bars separate to dispose the jaws 84 apart by a distance equal to the diameter of the O-ring 12. The tool 10 is then forced down upon the O-ring 12 so that it is captured by the jaws 84 at diametrically opposite locations. Movement of the tool 10 downwardly to engage the O-ring 12 results in the O-ring guide 70 engaging the surface upon which the O-ring 12 is lying and being forced upwardly against the bias of the spring 76 acting on the guide holder 62. FIG. 1 shows this condition of the tool 10. The button 46 is then released whereupon the spring 52 acts to retract the O-ring holder 62 into the shell 20 to the extent that the bars 80 move out of the inclined lower end portions of the bottoms of the grooves 86 with the upper portions of the bottoms of the grooves acting to move the lower ends of the bars 80 together causing the O-ring 12 to deflect as shown in FIG. 2. The tool 10 is then in condition for inserting the O-ring into the recess 100 of the bore 96.

The tool 10 is then manipulated so as to place the jaws 84 and O-ring guide 70 into an open end of the bore 96, it being noted that this end is chamfered, as at 102 at an angle which is complementary to the slope of the surfaces 83 of the O-ring holder bars 80. The chamfered bore surface 102 here cooperates with the holder bar surfaces 83 to center the holder 78 in the bore 96 and limit the depth of insertion of the tool to the correct depth for installation of the O-ring. The tool 14 is then in its equilibrium position or condition shown in FIG. 2. The worker then shifts the housing 14 downwardly relative to the holder 78. Since the stripper 94 is rigid with the lower end of the housing 14, it moves downwardly into the bore 96 and forces the O-ring 12 from the holder jaws 84 whereupon the O-ring straightens and moves into the recess 100. The O-ring tool 10 can then be withdrawn from the bore 96 without disturbing the O-ring 12.

The principles applied in this tool could be applied to tools wherein the movements thereof are controlled electrically, pneumatically or hydraulically so as to be conducive for production line use. However, even in this case where the movements are manually controlled an O-ring can be picked up and installed within five seconds.

We claim:

1. In an O-ring insertion tool including a housing defining a guide bore having an open end, an O-ring carrier supported by the housing in alignment with the longitudinal axis of and projecting from said end of said bore, an O-ring guide including a stem reciprocably mounted for movement along said guide bore and projecting from said end of the latter centrally through said carrier and having an enlarged cylindrical end adapted for slidable insertion through an open end of a part bore in which is located a recess for receiving an O-ring carried by the carrier, and a stripper supported by the housing for movement along said axis relative to said carrier between stripping and non-stripping positions, the improvement, comprising: said stripper being fixed to and projecting from an end of said housing; means supporting said carrier for reciprocable movement along said axis relative to said housing between an extended O-ring pick-up position and a retracted O-ring deposit position; and resiliently yieldable means acting between the housing and said means for supporting said carrier and normally maintaining said carrier in its O-ring deposit position.

2. The O-ring insertion tool defined in claim 1 wherein said O-ring carrier includes first and second jaws located relative to each other for gripping an O-ring at diametrically opposite locations.

3. The O-ring insertion tool defined in claim 2 wherein said first and second jaws are respectively defined by first and second recesses opening axially away from said open end.

4. The O-ring insertion tool defined in claim 1 wherein said means supporting includes a plunger reciprocably mounted in said bore.

5. The O-ring insertion tool defined in claim 4 wherein said O-ring carrier includes first and second bars pivotally connected at respective first ends to an end of said plunger for movement about respective first and second parallel axes located on opposite sides of and extending crosswise to the guide bore axis; and said first and second bars respectively having first and second jaws at respective second ends located for gripping an O-ring at diametrically opposite locations.

6. The O-ring insertion tool defined in claim 5 wherein said first and second jaws are respectively in the form of first and second recesses opening axially away from the guide bore open end.

7. The O-ring insertion tool defined in claim 5 wherein said housing includes first and second guide channels extending parallel to the axis of said guide bore and receiving said first and second bars; biasing means acting between said bars for yieldably biasing said bars away from each other about said first and second parallel axes; and said first and second guide channels respectively including first and second guide surfaces located in the path of pivotal movement of the bars and being configured so that as the carrier is moved to its O-ring pick-up position the guide surfaces permit the first and second jaws to be moved apart by said biasing means to a predetermined distance equal to that of the diameter of an O-ring to be picked up.

8. The O-ring insertion tool defined in claim 7 wherein said plunger has a second end, opposite to that to which the carrier bars are pivotally mounted, which projects through a wall of said housing; said second end of said plunger being defined by a button which is spaced from said wall when said carrier is in its retracted O-ring deposit position and which engages the wall when depressed for disposing the carrier in its extended O-ring pick-up position.

9. The O-ring insertion tool defined in claim 8 wherein said housing is cylindrical with said longitudinal axis being the axis thereof; said plunger having an annular shoulder spaced from said wall of the housing; said guide bore having an annular shoulder spaced from the annular shoulder of the plunger and slidably receiving said plunger; and said resiliently yieldable means including a coil compression spring located in the guide bore with opposite ends respectively engaging the plunger shoulder and the guide bore shoulder.

10. The O-ring insertion tool defined in claim 9 wherein said first and second bars each have a surface facing away from said housing and adapted for engaging a part when the jaws are inserted into a part bore; said resiliently yieldable means including a second coil compression spring, having a rate greater than that of the first-mentioned coil compression spring and located in said guide bore between said wall and the annular shoulder of the plunger so as to normally hold the housing in a position wherein said stripper is spaced from said first and second recesses but permitting movement of the housing toward the recesses when the surfaces of the bars are engaged with a part so as to move the stripper to its stripping position.

11. The O-ring insertion tool defined in claim 9 wherein said plunger includes a hollow chamber terminating in an end wall forming a portion of an end of the plunger which is opposite to that defined by the button; said stem being reciprocably received in said end wall and having a head located in said chamber; and a further coil compression spring acting between the head and the plunger and yieldably maintaining the O-ring guide in an extended position wherein said enlarged end is projected beyond said recesses of the O-ring carrier but permitting the guide to retract when engaged against a flat surface while the plunger is extended to position the carrier recesses for picking up an O-ring lying on said flat surface.

12. The O-ring insertion tool defined in claim 8 wherein said button is threadedly adjustably mounted on a remaining portion of the plunger whereby the amount of extension of the carrier from the housing can be adjusted so as to properly space said recesses for picking up an O-ring.

13. The O-ring insertion tool defined in claim 10 wherein the bar surfaces are adapted for engaging complementary surfaces formed at opposite diametrical locations of a bore located in said part so as to center the bars within the part bore.

* * * * *